United States Patent
Wu et al.

(10) Patent No.: US 6,679,177 B1
(45) Date of Patent: Jan. 20, 2004

(54) RESETTABLE AND REDUNDANT NEA-INITIATED HOLD-DOWN AND RELEASE MECHANISM FOR A FLIGHT TERMINATION SYSTEM

(75) Inventors: Jui-Yu Wu, Irvine, CA (US); Matthew B. Dalton, Moorpark, CA (US); John D. Kisch, Ventura, CA (US)

(73) Assignee: G&H Technology, Inc., Camarillo, CA (US)

( * ) Notice: Subject to any disclaimer, the term of this patent is extended or adjusted under 35 U.S.C. 154(b) by 0 days.

(21) Appl. No.: 10/131,903

(22) Filed: Apr. 24, 2002

(51) Int. Cl.$^7$ ............................. F42B 15/10; F42B 15/36
(52) U.S. Cl. ..................... 102/377; 244/131; 403/316
(58) Field of Search ............................. 102/374, 377, 102/378; 244/131; 285/308, 310, 321; 403/316, 317, 321, 322.1, 322.3, 325

(56) References Cited

U.S. PATENT DOCUMENTS

| | | | |
|---|---|---|---|
| 3,115,836 A | | 12/1963 | Brashears |
| 3,122,098 A | * | 2/1964 | Glennan ..................... 102/378 |
| 3,229,636 A | | 1/1966 | Mayo et al. |
| 3,513,512 A | | 5/1970 | Phillips |
| 3,863,570 A | | 2/1975 | Bixby |
| 3,867,893 A | * | 2/1975 | Saholt et al. ............... 102/378 |
| 3,903,803 A | * | 9/1975 | Losey ........................ 102/378 |
| 4,007,688 A | | 2/1977 | Franz |
| 4,715,565 A | * | 12/1987 | Wittmann ................... 102/377 |
| 4,771,696 A | * | 9/1988 | Smolnik ..................... 102/473 |
| 6,269,748 B1 | * | 8/2001 | Rudoy et al. ............... 102/377 |

* cited by examiner

*Primary Examiner*—Harold J. Tudor
(74) *Attorney, Agent, or Firm*—Thomas I. Rozsa; Tony D. Chen

(57) ABSTRACT

A hold-down and release apparatus for a flight termination system having a terminal portion for holding-down and releasing a structural object which has an arrangement for attaching to the flight termination system. The hold-down and release apparatus includes several movable clamping segments provided on the terminal portion of the flight termination system that are engageable in a complimentary fashion with the attachment arrangement on the structural object for releasably attaching the structural object to the flight termination system. The hold-down and release apparatus also includes springs for biasing the movable clamping segments means in a disengaging direction that causes the clamping segments to disengage from the attachment arrangement on the structural object to release the structural object from the flight termination system. The hold-down and release apparatus further includes a release band attached to the movable clamping segments for preventing the disengaging movement of the movable clamping segments such that they remain engaged to the attachment arrangement of the structural object for releasably attaching the structural object to the flight termination system. The release band is held in position by two non-explosive actuators (NEAs), such that either one or both actuators may initiate the release and loosen the release band which allows the movable clamping segments to move under the urge of the biasing, springs to disengage the complimentary attachment arrangement from the attachment arrangement of the structural object, to release the structural object from the flight termination system.

10 Claims, 5 Drawing Sheets

RESETTABLE AND REDUNDANT NEA-INITIATED HOLD-DOWN AND RELEASE MECHANISM FOR A FLIGHT TERMINATION SYSTEM

BACKGROUND OF THE INVENTION

1. Field of the Invention

The present invention relates generally to the field of structural separation mechanisms. More particularly, the present invention relates to the field of hold-down and release mechanism for flight termination-systems.

2. Description of the Prior Art

Structural separation mechanisms are widely used in aerospace, manufacturing and construction industries. The main purpose of utilizing a structural separation mechanism is to release an externally attached structural object in a quick and reliable manner without damaging the external structural object.

The following five (5) prior art patents are found to be pertinent to the field of the present invention:

1. U.S. Pat. No. 3,115,836 issued to Brashears on Dec. 31, 1963 for "Clamping Ring Release Mechanism" (hereafter the "Brashears Patent");
2. U.S. Pat. No. 3,229,636 issued to Mayo et al. on Jan. 18, 1966 for "Missile Stage Separation Indicator And Stage Initiators" (hereafter the "Mayo Patent");
3. U.S. Pat. No. 3,513,512 issued to Phillips on May 26, 1970 for "Fastening Assembly With Quick Release" (hereafter the "Phillips Patent");
4. U.S. Pat. No. 3,863,570 issued to Bixby on Feb. 4, 1975 for "Hydraulic Pressure Actuated Missile Stage Separation" (hereafter the "Bixby Patent"); and
5. U.S. Pat. No. 4,007,688 issued to Franz on Feb. 15, 1977 for "Timed Missile Flight Termination System" (hereafter the "Franz Patent").

The Brashears Patent discloses a clamping ring release mechanism having a sensing cylinder in which a piston disposed within the cylinder responds to a drop in pressure. The pressure drop then actuates a microswitch. The sensing cylinder is mounted on the booster of a missile-booster combination and actuated by pressure bled from the booster chamber. The piston of the sensing cylinder, in responding to a drop in booster pressure at boost phase termination, actuates a microswitch which closes a circuit from a thermal battery to an explosive containing cylinder that is also mounted on the booster. The explosive containing cylinder upon detonation, releases a scissors mechanism holding together a clamping ring that couples the missile to the booster.

The Mayo Patent discloses a missile stage separation indicator and stage initiator. It comprises a piston, a spring, and a lever assembly for generating an electric pulse. The mechanism is designed to separate two stages of a missile.

The Phillips Patent discloses a fastening assembly with a quick release. The Phillips Patent is cited as being of general interest with respect to a piston, a cylinder or a spring separation assembly for a missile and the like.

The Bixby Patent discloses a hydraulic pressure actuated missile stage separation. The separation mechanism includes a piston, a cylinder or a spring separation assembly for a missile and the like.

The Franz Patent discloses a timed missile flight termination system. It comprises a pressure activated, timed missile flight termination system. The system is activated by pressure created within the combustion chamber of the missile to activate a time delay fuse. The fuse is therefore activated instantaneously with ignition of the missile. The delay fuse provides a predetermined period before the designation of a linear-shaped charge to terminate the flight of the missile.

While various approaches were developed in the prior art in the field of structural separation mechanisms, most conventional flight termination systems use pyrotechnic devices in their structural separation mechanisms.

Therefore, it is still highly desirable to design and construct a new resettable and redundant hold-down and release mechanism for a flight termination system. It is also highly desirable to design and construct a resettable and redundant hold-down and release mechanism which can be initiated by refurbishable non-explosive actuators (NEAs).

BRIEF SUMMARY OF THE INVENTION

The present invention is a novel and unique resettable and redundant non-explosive actuator (NEA) initiated hold-down and release mechanism for a flight termination system.

It is an object of the present invention to provide a hold-down and release mechanism for flight termination systems.

It is also an object of the present invention to provide a resettable hold-down and release mechanism for flight termination systems.

It is another object of the present invention to provide a redundant hold-down and release mechanism for flight termination systems.

It is a further object of the present invention to provide a non-explosive actuator (NEA) initiated hold-down and release mechanism for flight termination systems.

Described briefly in general terms, the present invention is a hold-down and release apparatus for a flight termination system for holding-down and releasing a structural object; the flight termination system having a generally cylindrical shaped end portion with an end opening, and the structural object having a generally cylindrical shaped end portion with a circular engagement member. The hold-down and release apparatus includes a circular engagement sleeve mounted inside the end opening of the generally cylindrical shaped end portion of the flight termination system for receiving the circular engagement member of the generally cylindrical shaped end portion of the structural object. The hold-down and release apparatus also includes a circumferential external circular groove provided on the circular engagement member of the structural object.

The circular engagement sleeve has a multiplicity of internal clamping segments symmetrically located in a circular cavity between the circular sleeve and a sidewall of the generally cylindrical shaped end portion of the flight termination system; each internal clamping segment extending through a slot on the circular engagement sleeve respectively to engage into the circular groove of the circular engagement member of the structural object to hold-down the structural object when the circular engagement member of the structural object is inserted into the circular engagement sleeve of the flight termination system. Each one of the clamping segments is movable along a radial direction and biased by internal compression springs which push each respective clamping segment to move radially outwardly along the radial direction if unrestrained.

The hold-down and release apparatus further includes a generally circular release band wound around the multiplicity of movable clamping segments to counter the compression springs and restrain the outward movement of said internal clamping segments such that the clamping segments remain extending inwardly through the slot on the circular sleeve and engaging into the circular groove of the circular engagement member of the structural object for holding-down the structural object.

The circular release band has two ends each being held in place by a non-explosive actuator (NEA), where either one or both NEAs may initiate the release of a respective one or both of the two ends of the circular release band which loosens the circular release band around the clamping segments, which in turn allows the clamping segments to move radially outwardly under the bias force of the compression spring and disengage from the circular groove of the circular engagement member of the structural object, to release the structural object from the flight termination system.

The present invention has many advantages. The major advantage of the present invention is that it provides a structural separation mechanism that is resettable and redundant. Another major advantage of the present invention is that it provides a structural separation mechanism that can be initiated by refurbishable NEAs. These features of the present invention provide superior safety, reliability and cost-effectiveness.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated.

DETAILED DESCRIPTION OF THE PREFERRED EMBODIMENT

Figures 1, 5:
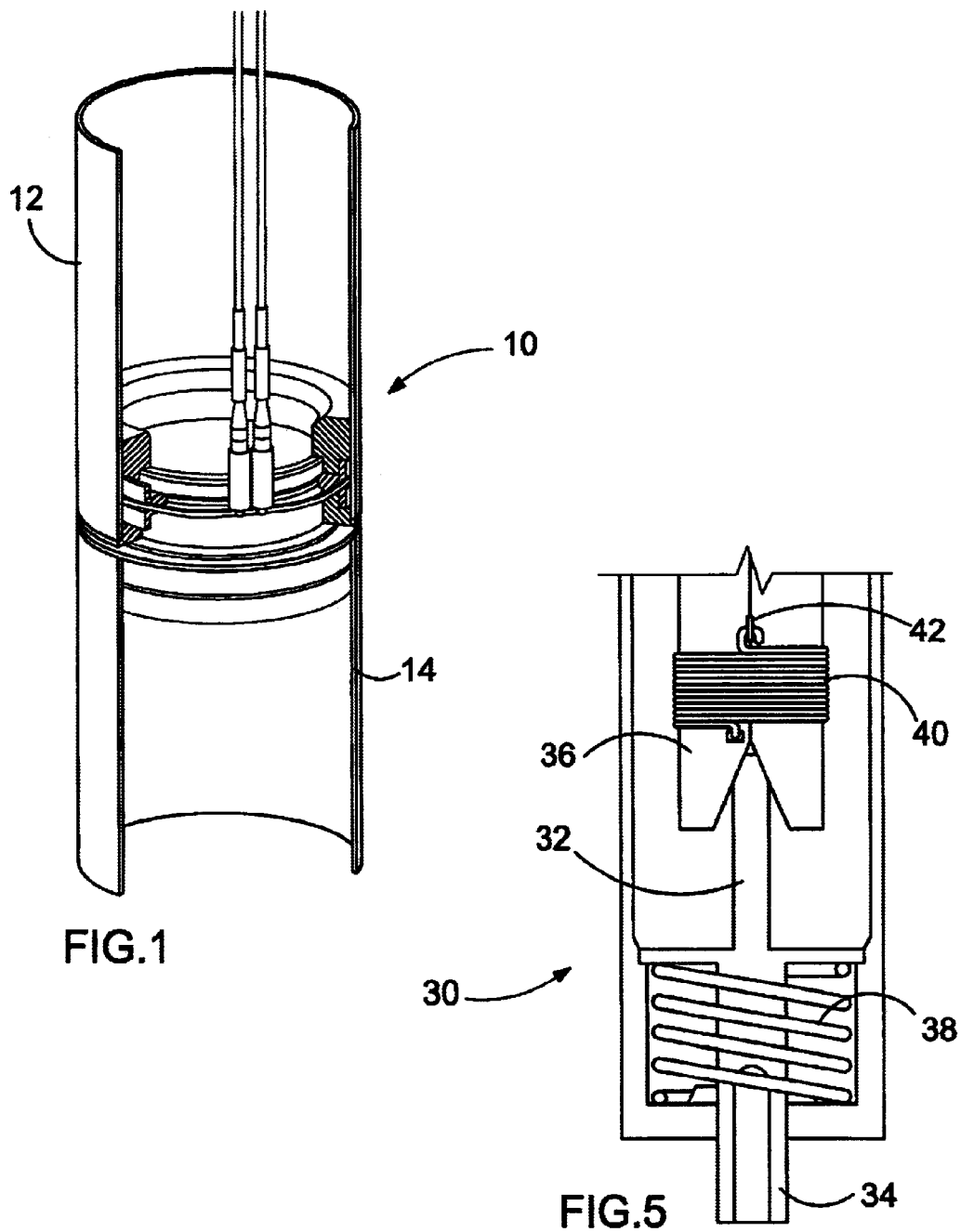
FIG. 1 is a perspective partial-exposed view of one of the preferred embodiments of the present invention resettable and redundant hold-down and release mechanism for a flight termination system.
FIG. 5 is an enlarged partial-exposed view of a refurbishable non-explosive actuator (NEA) utilized in the present invention for initiating the separation of the structural object from the flight termination system.
Figure 2:
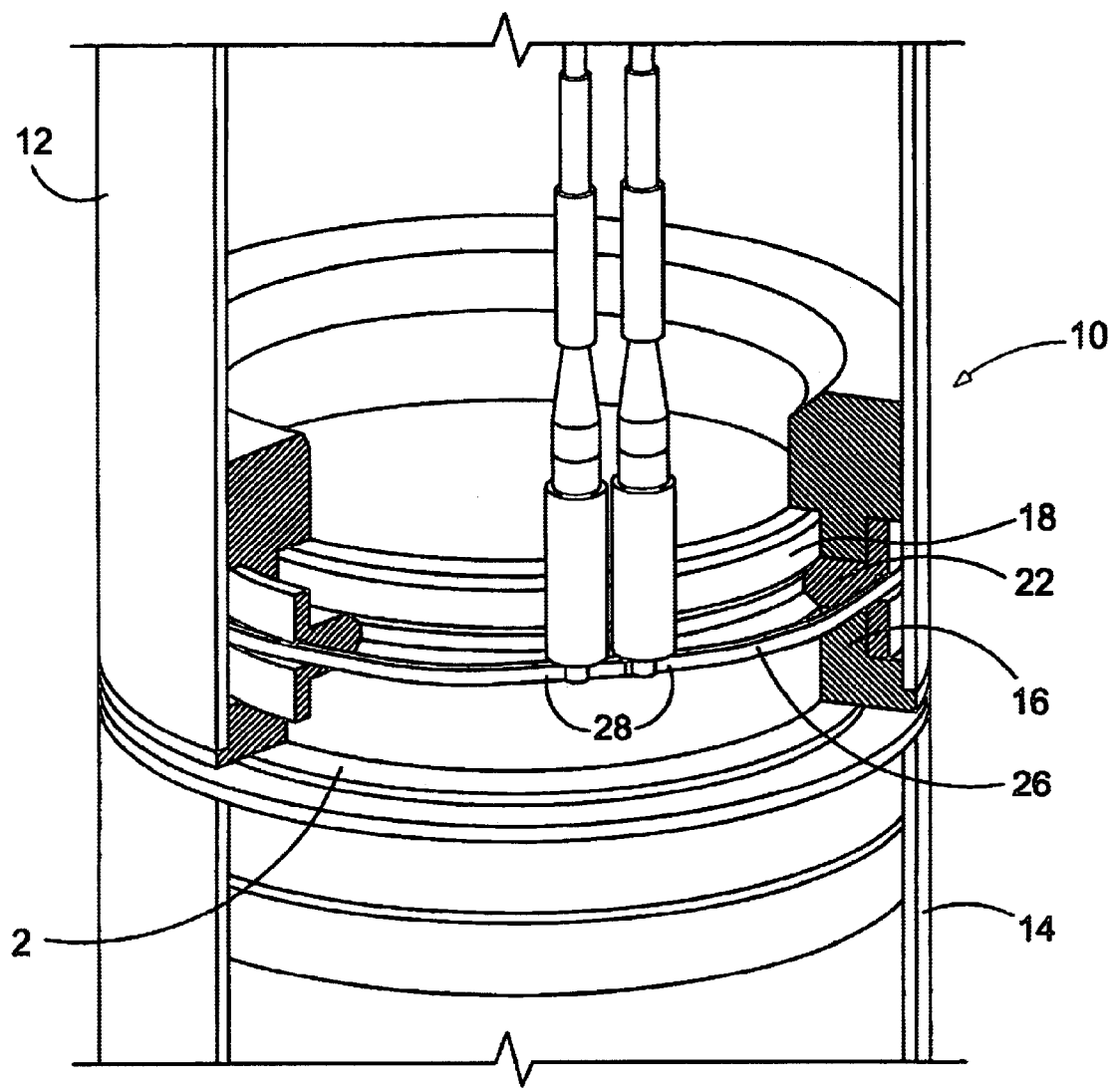
FIG. 2 is an enlarged partial-exposed view of the preferred embodiment of the present invention resettable and redundant hold-down and release mechanism for a flight termination system.

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Referring to FIGS. 1 through 4, there is shown one of the preferred embodiments of the present invention resettable and redundant non-explosive actuator (NEA) initiated hold-down and release mechanism 10 for a flight termination system. The NEA-initiated hold-down and release mechanism 10 is part of a flight termination system (partially shown in the drawings) for holding-down and releasing a structural object (also partially shown in the drawings).

In the preferred embodiment of the present invention, the flight-termination system has a generally cylindrical shaped end or terminal portion 12 for engaging with a generally cylindrical shaped end engagement or terminal portion 14 of the structural object. The generally cylindrical shaped end portion 12 of the flight termination system has an end opening with a circular engagement sleeve 16 for receiving a circular engagement member 18 which is mounted on the generally cylindrical shaped end portion 14 of the structural object.

The circular engagement member 18 of the structural object has a circumferential circular groove 20. The circular engagement sleeve 16 of the flight termination system has one or more symmetrically located internal clamping segments 22. Each clamping segment 22 has a protruding flange for engaging into the circumferential circular groove 20.

The clamping segments 22 are installed in a circular cavity between the circular sleeve 16 and the sidewall of the generally cylindrical shaped end portion 12 of the flight termination system, and extending inwardly through a slot on the circular sleeve 16. In the preferred embodiment of the present invention, there are three clamping segments arranged 120 degrees apart around the circle.

When the circular engagement member 18 of the structural object is inserted into the circular engagement sleeve 16 of the flight termination system, the clamping segments 22 of circular engagement sleeve 16 of the flight termination system can extend into the circular groove 20 of the circular engagement member 18 of the structural object to retain or hold-down the structural object.

Figure 3:
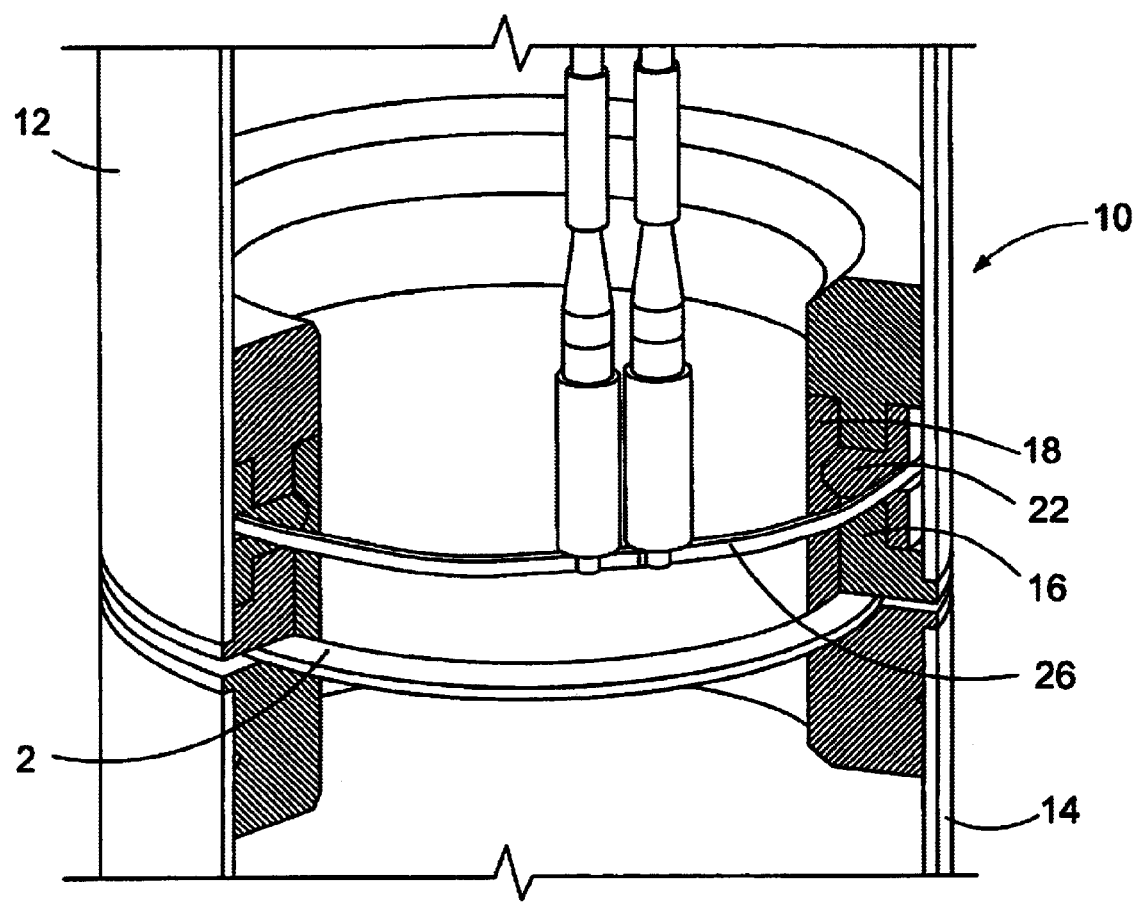
FIG. 3 is an enlarged partial cross-sectional view of the preferred embodiment of the present invention resettable and redundant hold-down and release mechanism for a flight termination system, showing that the structural object is being held-down by the flight termination system.

The clamping segments 22 are designed to be movable along a radial direction. Internal compression springs 24 are provided to push the clamping segments 22 radially outwardly along the radial direction. However, a generally circular release band 26 preferably made of steel is also provided around the movable clamping segments 22 to counter the compression spring 24 and restrain the outward movement of the clamping segments 22. As a result, when restrained by the circular release band 26, the clamping segments 22 are in their inward-most positions and extending inwardly through the slot on the circular sleeve 16 and into the circular groove 20 of the circular engagement member 18 of the structural object, as shown in FIG. 3. In this configuration, the engagement portion 14 of the structural object is held-down and retained by the end portion 12 of the flight termination system.

The circular release band 26 has two ends 28 each held in place by a non-explosive actuator (NEA) 30. When the two ends 28 of the circular release band 26 are held together by the two NEAs 30, the circular release band 26 is in tension and restrains the outward movement of the clamping segments 22, such that the structural object remains to be held-down and retained by the flight termination system.

Figure 4:
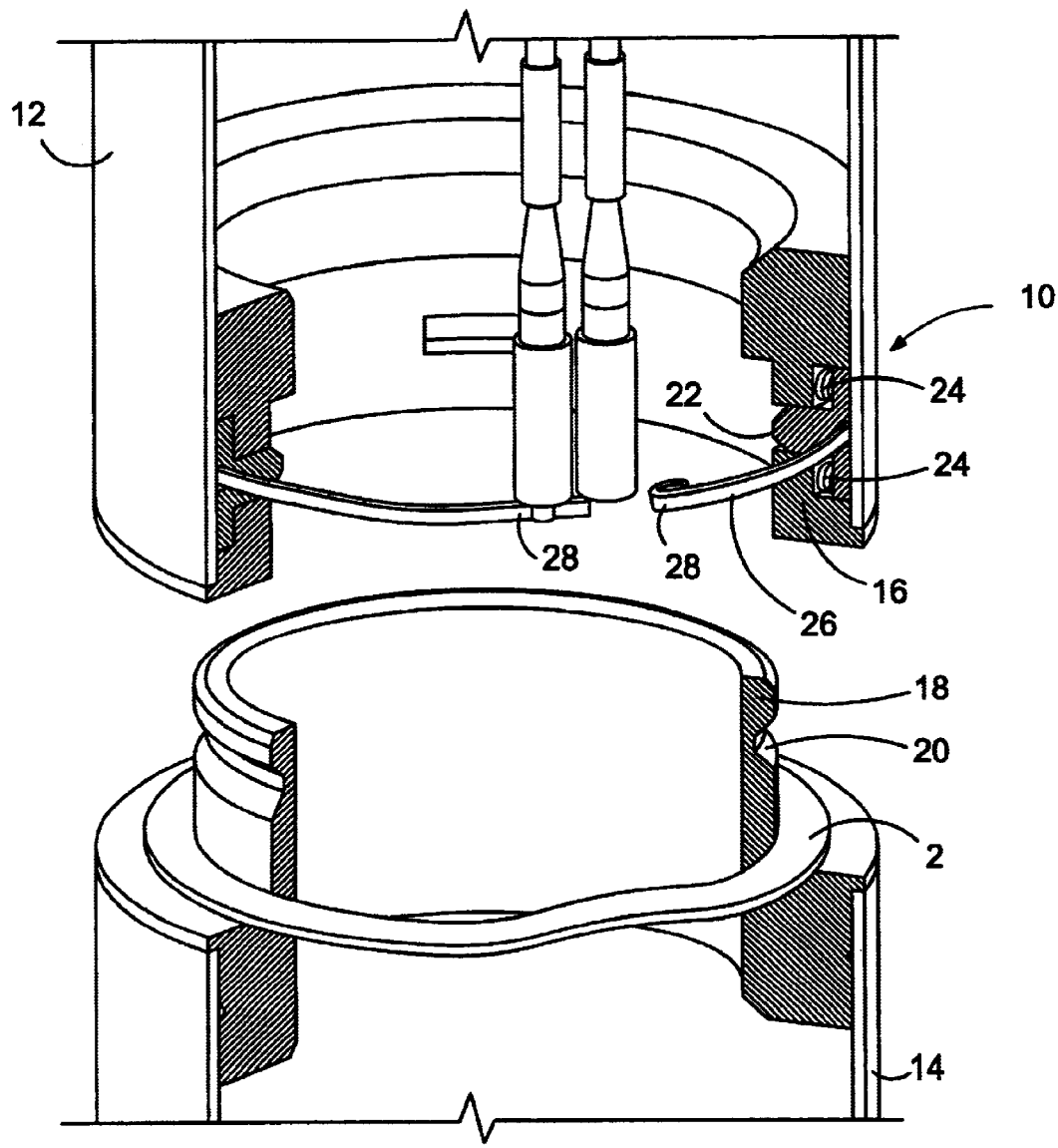
FIGS. 4 and 4a are an enlarged partial cross-sectional view and an exploded view, respectively, of the preferred embodiment of the present invention resettable and redundant hold-down and release mechanism for a flight termination system, showing that the structural object is released from the flight termination system.
Figure 4A:
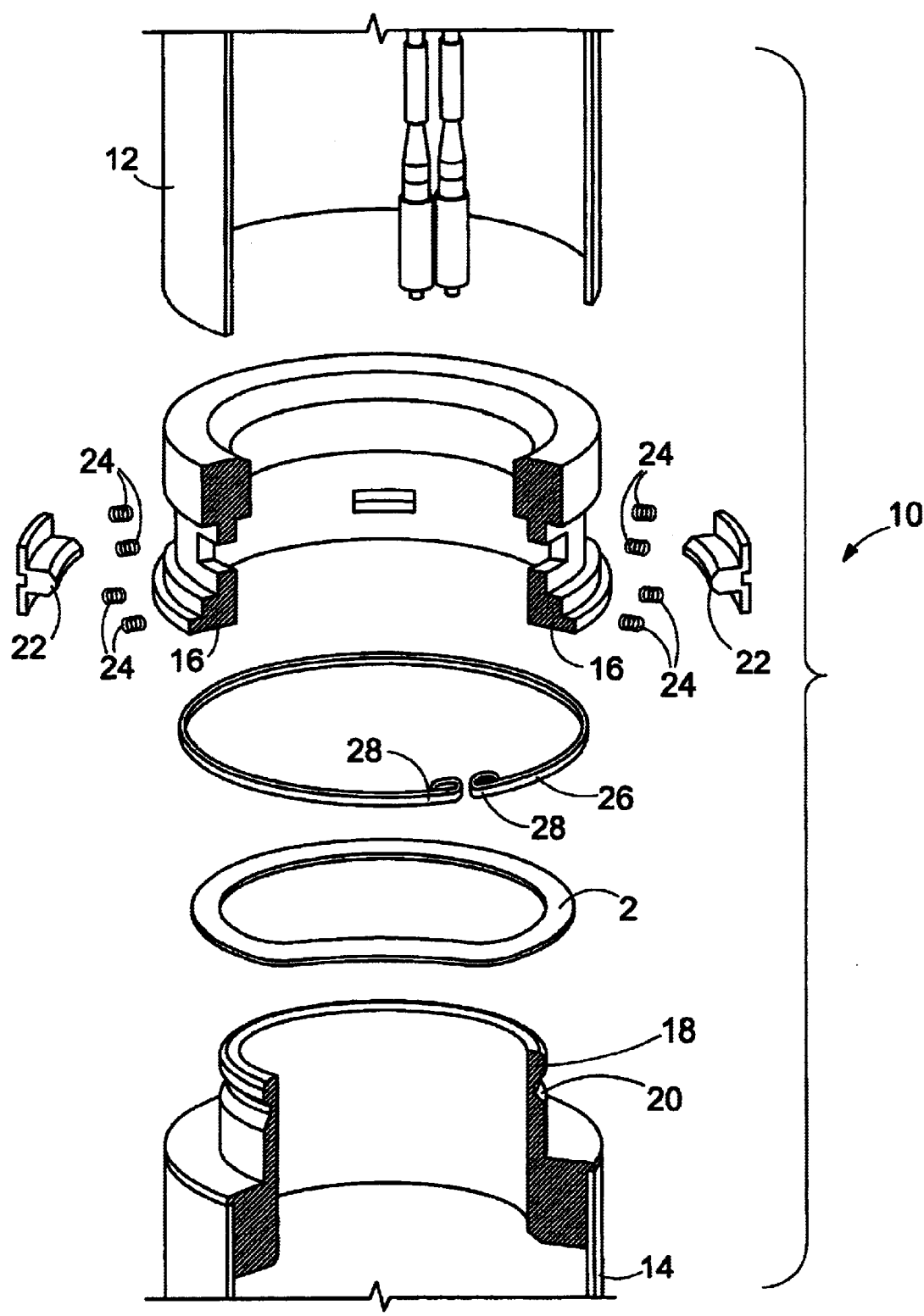

However, when either or both of the two ends 28 of the circular band 26 are released by one or both of the NEAs 30, the circular release band 26 will not be able to counter the bias force from the compression springs 24. As a result, the internal clamping segments 22 will be pushed by the compression spring 24 to move outwardly and disengages from the circular groove 20 of the circular engagement member 18 of the structural object. In this case the structural object will be released by and separated from the flight termination system, as shown in FIG. 4.

The hold-down and release mechanism 10 can be reset after each use by re-attaching the ends 28 of the release band 26 to the NEAs 30. The hold-down and release mechanism 10 is also redundant in that either one or both of the two NEAs 30 can initiate the release process so that a failure in one of the two NEAs 30 will not prevent the structural object 14 from being successfully released.

An ejection wave washer 2 is placed between the flight termination system and the structural object. When the structural object is held-down by the flight termination system, the wave washer 2 is squeezed and deformed and stores spring energy in the process. When the clamping segments 22 disengage the circular groove 20 to release the structural object, the spring energy stored in the wave washer 2 acts to reform the wave washer 2 and thereby ejects the structural object from the flight termination system.

Referring to FIG. 5, there is shown an NEA 30 utilized in the present invention hold-down and release mechanism 10. The NEA 30 includes a plunger 32 which has a distal end 34 serving as a holding pin for holding one of the two ends 28 of the circular band 26 (as shown in FIGS. 1–4). The NEA 30 also has an expandable spool 36. The plunger 32 is biased against the spool 36 by a coil spring 38. When the spool 36 is closed, it resists the movement of the plunger 32. As a result, the pin end 34 of the plunger 32 holds the end 28 of the release band 26 which in turn holds the clamping segments 22 in the engaged position to hold-down the structural object, as previously described in detail.

The expandable spool 36 is held together by a wound coil spring 40 which is held tight by a thin metal wire 42. When an electrical pulse is delivered to the thin wire 42, it weakens and breaks and allows the coil spring 40 to un-wind, which allows the spool 36 to expand, which in turn allows the plunger 32 to move upward. As a result, the pin end 34 of the plunger 32 releases the end 28 of the release band 26 which in turn allows the clamping segments 22 to be disengaged to release the structural object, as previously described in detail.

The NEAs 30 utilized in the present invention can be refurbished after each use by pushing back the plunger 32 against the spring 38 and using another metal wire to re-bound the spool 36 for restraining the movement of the plunger 32.

The present invention has many advantages. It provides a structural hold-down and release mechanism that is resettable and redundant and can be initiated by refurbishable NEAs. This provides superior safety, reliability and cost-effectiveness in the both the manufacture and application of the present invention structural hold-down and release mechanism in flight termination systems.

Defined in detail, the present invention is a hold-down and release apparatus for a flight termination system for holding-down and releasing a structural object, the flight termination system having a generally cylindrical shaped end portion with an end opening, and the structural object having a generally cylindrical shaped end portion with a circular engagement member, the hold-down and release apparatus comprising: (a) a circular engagement sleeve mounted inside the end opening of the generally cylindrical shaped end portion of the flight termination system for receiving the circular engagement member of the generally cylindrical shaped end portion of the structural object; (b) a circumferential external circular groove provided on the circular engagement member of the structural object; (c) the circular engagement sleeve having a multiplicity of internal clamping segments symmetrically located in a circular cavity between the circular sleeve and a sidewall of the generally cylindrical shaped end portion of the flight termination system, each internal clamping segment respectively extending through a slot on the circular engagement sleeve to engage into the circular groove of the circular engagement member of the structural object to hold-down the structural object when the circular engagement member of the structural object is inserted into the circular engagement sleeve of the flight termination system; (d) each one of the clamping segments being movable along a radial direction and biased by an internal compression spring which pushes the each clamping segment to move radially outwardly along the radial direction if unrestrained; (e) a generally circular release band wound around the multiplicity of movable clamping segments to counter the compression springs and restrain the outward movement of sad internal clamping segments such that the clamping segments remain extending inwardly through the slot on the circular sleeve and engaging into the circular groove of the circular engagement member of the structural object for holding-down the structural object; and (f) the circular release band having two ends each being held in place by a non-explosive actuator (NEA), where either one or both NEAs may initiate the release of a respective one or both of the two ends of the circular release band which loosens the circular release band around the clamping segments, which in turn allows the clamping segments to move radially outwardly under the bias force of the compression spring and disengage from the circular groove of the circular engagement member of the structural object, to release the structural object from the flight termination system.

Defined broadly, the present invention is a hold-down and release apparatus for a flight termination system for holding-down and releasing a structural object, the flight termination system having an end portion with an end opening, and the structural object having an end portion with an engagement member, the hold-down and release apparatus comprising: (a) an engagement sleeve mounted inside the end opening of the end portion of the flight termination system for receiving the engagement member of the end portion of the structural object; (b) a circumferential external groove provided on the engagement member of the structural object; (c) the engagement sleeve having at least one internal clamping segment, the at least one internal clamping segment being movable along a transverse direction and extending through a slot on the engagement sleeve to engage into the external groove of the engagement member of the structural object to hold-down the structural object when the engagement member of the structural object is inserted into the engagement sleeve of the flight termination system; (d) means for biasing the at least one clamping segment in an outward transverse direction; (e) a release band attached to the at least one clamping segment to counter the biasing means and restrain the outward movement of the at least one clamping segment such that the at least one clamping segment remains extending inwardly through the slot on the sleeve and engaging into the groove of the engagement member of the structural object for holding-down the structural object; and (f) the release band held in position by two non-explosive actuators (NEAs), where either one or both NEAs may initiate the release and loosen the release band around the clamping segments, which allows the clamping segments to move transversely outwardly under the urge of the biasing means and disengage from the external groove of the engagement member of the structural object, to release the structural object from the flight termination system.

Defined more broadly, the present invention is a hold-down and release apparatus for a flight termination system for holding-down and releasing a structural object, the flight termination system having an end portion with an end opening, and the structural object having an end portion with an engagement member, the hold-down and release apparatus comprising: (a) a receiving member located inside the end opening of the end portion of the flight termination system for receiving the engagement member of the end portion of the structural object; (b) the receiving member having at least one movable clamping segment for engaging with a complimentary means on the engagement member of the structural object for holding-down the structural object; (c) means for biasing the at least one clamping segment in a disengaging direction that causes the clamping segment to disengage from the complimentary means on the engagement member of the structural object to release the structural object; (d) restraining means attached to the at least one clamping segment for preventing the disengaging movement of the at least one clamping segment such that the at least one clamping segment remains engaged to the complimentary means of the engagement member of the structural object for holding-down the structural object; and (e) the restraining means held in position by at least two actuators, where either one or both actuators may initiate the release and loosen the restraining means around the at least one clamping segment, which allows the at least one clamping segment to move under the urge of the biasing means and disengage from the complimentary means of the engagement member of the structural object, to release the structural object from the flight termination system.

Defined more broadly, the present invention is a hold-down and release apparatus for a flight termination system having a terminal portion for holding-down and releasing a structural object which has an arrangement for attaching to the flight termination system, the hold-down and release apparatus comprising: (a) at least one movable holding means provided on the terminal portion of the flight termination system, and having a complimentary attachment arrangement that is engageable in a complimentary fashion with the attachment arrangement on the structural object for releasably attaching the structural object to the flight termination system; (b) means for biasing the at least one movable holding means in a disengaging direction that causes the complimentary attachment arrangement of the at least one movable holding means to disengage from the attachment arrangement on the structural object to release the structural object from the flight termination system; (c) restraining means attached to the at least one movable holding means for preventing the disengaging movement of the at least one movable holding means such that the complimentary attachment arrangement of the at least one movable holding means remains engaged to the attachment arrangement of the structural object for releasably attaching the structural object to the flight termination system; and (d) the restraining means held in position by at least two actuators, where either one or both actuators may initiate the release and loosen the restraining means around the at least one movable holding means, which allows the at least one movable holding means to move under the urge of the biasing means to disengage the complimentary attachment arrangement from the attachment arrangement of the structural object, to release the structural object from the flight termination system.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

The present invention has been described in considerable detail in order to comply with the patent laws by providing full public disclosure of at least one of its forms. However, such detailed description is not intended in any way to limit the broad features or principles of the present invention, or the scope of the patent to be granted. Therefore, the invention is to be limited-only by the scope of the appended claims.

What is claimed is:

1. A hold-down and release apparatus for a flight termination system for holding-down and releasing a structural object, the flight termination system having a generally cylindrical shaped end portion with an end opening, and the structural object having a generally cylindrical shaped end portion with a circular engagement member, the hold-down and release apparatus comprising:

a. a circular engagement sleeve mounted inside said end opening of said generally cylindrical shaped end portion of said flight termination system for receiving said circular engagement member of said generally cylindrical shaped end portion of said structural object;

b. a circumferential external circular groove provided on said circular engagement member of said structural object;

c. said circular engagement sleeve having a multiplicity of internal clamping segments symmetrically located in a circular cavity between said circular sleeve and a sidewall of said generally cylindrical shaped end portion of said flight termination system, each internal clamping segment respectively extending through a slot on said circular engagement sleeve to engage into said circular groove of said circular engagement member of said structural object to hold-down said structural object when said circular engagement member of said structural object is inserted into said circular engagement sleeve of said flight termination system;

d. each one of said clamping segments being movable along a radial direction and biased by an internal compression spring which pushes said each clamping segment to move radially outwardly along the radial direction if unrestrained;

e. a generally circular release band wound around said multiplicity of movable clamping segments to counter said compression springs and restrain the outward movement of sad internal clamping segments such that said clamping segments remain extending inwardly through said slot on said circular sleeve and engaging into said circular groove of said circular engagement member of said structural object for holding-down said structural object; and f. said circular release band having two ends each being held in place by a non-explosive actuator (NEA), where either one or both NEAs may initiate the release of a respective one or both of the two ends of said circular release band which loosens said circular release band around said clamping segments, which in turn allows said clamping segments to move radially outwardly under the bias force of said compression spring and disengage from said circular groove of said circular engagement member of said structural object, to release said structural object from said flight termination system.

2. The hold-down and release apparatus in accordance with claim 1, wherein said multiplicity of clamping segments comprises three clamping segments positioned 120 degrees apart within said circular cavity.

3. The hold-down and release apparatus in accordance with claim 1, wherein said release band is made of steel.

4. The hold-down and release apparatus in accordance with claim 1, further comprising an ejection wave washer positioned between said end portion of said flight termination system and said end portion of said structural object for facilitating the separation of said structural object from said flight termination system.

5. A hold-down and release apparatus for a flight termination system for holding-down and releasing a structural object, the flight termination system having an end portion with an end opening, and the structural object having an end portion with an engagement member, the hold-down and release apparatus comprising:

a. an engagement sleeve mounted inside said end opening of said end portion of said flight termination system for receiving said engagement member of said end portion of said structural object;

b. a circumferential external groove provided on said engagement member of said structural object;

c. said engagement sleeve having at least one internal clamping segment, the at least one internal clamping segment being movable along a transverse direction and extending through a slot on said engagement sleeve to engage into said external groove of said engagement member of said structural object to hold-down said structural object when said engagement member of said structural object is inserted into said engagement sleeve of said flight termination system;

d. means for biasing said at least one internal clamping segment in an outward transverse direction;

e. a release band attached to said at least one internal clamping segment to counter said biasing means and restrain the outward movement of said at least one internal clamping segment such that said at least one internal clamping segment remains extending inwardly through said slot on said sleeve and engaging into said groove of said engagement member of said structural object for holding-down said structural object; and f. said release band held in position by two non-explosive actuators (NEAs), where either one or both NEAs may initiate the release and loosen said release band around said at least one internal clamping segment, which allows said at least one internal clamping segment to move transversely outwardly under the urge of said biasing means and disengage from said external groove of said engagement member of said structural object, to release said structural object from said flight termination system.

6. The hold-down and release apparatus in accordance with claim 5, wherein said biasing means comprises at least one spring.

7. The hold-down and release apparatus in accordance with claim 5, wherein said release band is made of steel.

8. The hold-down and release apparatus in accordance with claim 5, further comprising an ejection wave washer positioned between said generally cylindrical shaped end portion of said flight termination system and said generally cylindrical shaped end portion of said structural object for facilitating the separation of said structural object from said flight termination system.

9. The hold-down and release apparatus in accordance with claim 5, wherein said release band has two ends.

10. The hold-down and release apparatus in accordance with claim 9, wherein said two NEAs are used to respectively hold said two ends of said release band in position.

* * * * *